US012785775B2

(12) United States Patent
He et al.

(10) Patent No.: US 12,785,775 B2
(45) Date of Patent: Nov. 3, 2026

(54) CHANNEL STATE INFORMATION REPORTING FOR REDUCED CAPABILITY WIRELESS DEVICE OPERATION

(71) Applicant: Apple Inc., Cupertino, CA (US)

(72) Inventors: Hong He, Cupertino, CA (US); Yushu Zhang, Beijing (CN); Dawei Zhang, Saratoga, CA (US); Wei Zeng, San Diego, CA (US); Haitong Sun, Cupertino, CA (US); Chunxuan Ye, San Diego, CA (US); Weidong Yang, San Diego, CA (US); Seyed Ali Akbar Fakoorian, San Diego, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 18/838,537

(22) PCT Filed: Mar. 25, 2022

(86) PCT No.: PCT/CN2022/083013
§ 371 (c)(1),
(2) Date: Aug. 14, 2024

(87) PCT Pub. No.: WO2023/178647
PCT Pub. Date: Sep. 28, 2023

(65) Prior Publication Data

US 2025/0158681 A1 May 15, 2025

(51) Int. Cl.
*H04B 7/06* (2006.01)
*H04W 24/10* (2009.01)

(52) U.S. Cl.
CPC .......... *H04B 7/0626* (2013.01); *H04W 24/10* (2013.01)

(58) Field of Classification Search
CPC .... H04B 7/0626; H04W 24/10; H04W 48/16; H04L 5/001; H04L 5/0057; H04L 5/0098
USPC .......................................................... 370/329
See application file for complete search history.

(56) References Cited

U.S. PATENT DOCUMENTS 11,943,169 B2 * 3/2024 Yokomakura ......... H04L 5/0094
2019/0215130 A1 7/2019 Aiba
2021/0298038 A1 9/2021 Kang
2022/0053522 A1 * 2/2022 MolavianJazi ....... H04L 1/1819
2022/0239357 A1 * 7/2022 Chung ................. H04B 7/0626
(Continued)

FOREIGN PATENT DOCUMENTS

CN 111656714 9/2020
CN 112514308 3/2021

OTHER PUBLICATIONS

International Search Report for PCT/CN2022/083013; Dec. 29, 2022.

*Primary Examiner* — Robert J Lopata
(74) *Attorney, Agent, or Firm* — Kowert, Hood, Munyon, Rankin & Goetzel, P.C.

(57) ABSTRACT

This disclosure relates to techniques for performing channel state information reporting for enhanced reduced capability (eRedcap) wireless devices in a wireless communication system. A cellular network may configure reference signals for multiple bandwidth parts and may configure an eRedcap device to report measurements on active and deactivated bandwidth parts. An eRedcap device may perform measurements of reference signals on a deactivated bandwidth part and provide reporting to the network based on the configuration.

20 Claims, 12 Drawing Sheets

(56) References Cited

U.S. PATENT DOCUMENTS

2023/0337036 A1* 10/2023 Lo ......................... H04W 24/10
2024/0414772 A1* 12/2024 Kim ...................... H04W 36/00

* cited by examiner

| Use Cases | Date Rate |
| --- | --- |
| Industrial wireless sensors | <2Mbps |
| Video surveillance | Economic video: 2-4 Mbps,<br>High-end video: 7.5-25 Mbps |

FIG. 6

| SCS (kHz) | 5 MHz | 10 MHz | 15 MHz | 20 MHz |
| --- | --- | --- | --- | --- |
| | $N_{RB}$ | $N_{RB}$ | $N_{RB}$ | $N_{RB}$ |
| 15 | 25 | 52 | 79 | 106 |
| 30 | 11 | 24 | 38 | 51 |

FIG. 7

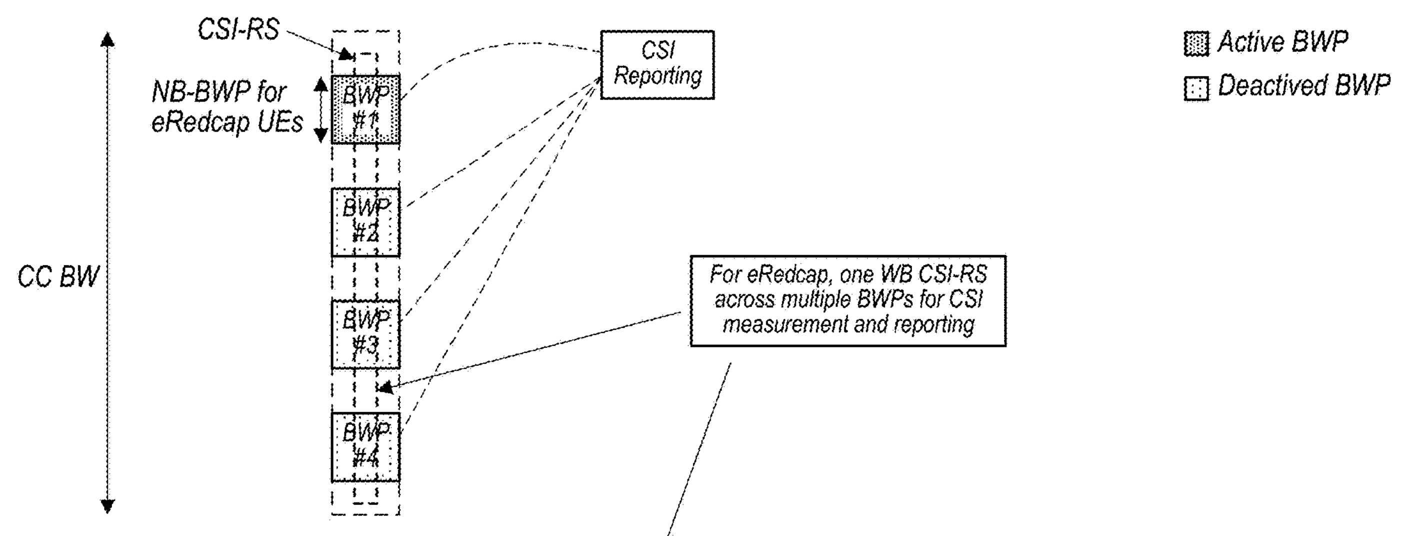

```
-- ASN1SRART
-- TAG-CSI-RESOURCECONFIG-START

CSI-ResourceConfig ::=      SEQUENCE {
    csi-ResourceConfigid        CSI-ResourceConfigId,
    csi-RS-ResourceSet -List    CHOICE {
        nzp-CSI-RS-SSB              SEQUENCE {
            nzp-CSI-RS-ResourceSetList  SEQUENCE (SIZE (1..maxNrofNZP-CSI-RS-ResourceSetsPerConfig)) OF NZP-CSI-RS-ResourceSetId
                                                                                                                  OPTIONAL, -- Need R
            csi-SSB-ResourceSetList     SEQUENCE (SIZE (1..maxNrofCSI-SSB-ResourceSetsPerConfig)) OF CSI-SSB-ResourceSetId  OPTIONAL -- Need R
    },
    bwp-IdList                          SEQUENCE (SIZE (1..maxNrofbWPs)) OF BWP-Id|,
    resourceType                    ENUMERATED { apweriodic, semiPersistent, periodic },
    ...
}

--TAG-CSI-RESOURCECONFIG-STOP
--ASN1STOP
```

FIG. 9

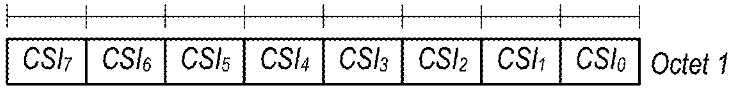
FIG. 12
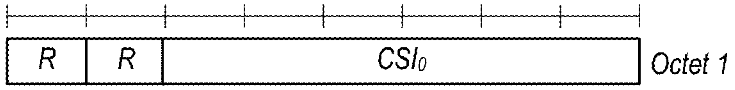
FIG. 13
| Value of CRA field | CSI reporting ID | Notes |
|---|---|---|
| '00' | No CSI report is activated | |
| '01' | <ID-Y1; ID_Y2, ...> | Different CSI reports maybe associated with different deactivated BWPs and/or the active BWP |
| '10' | <ID-Y1; ID_Y3, ...> | |
| '11' | <ID-Y1; ID_Y6, ...> | |
Different CSI reports in different DL BWPs
FIG. 14
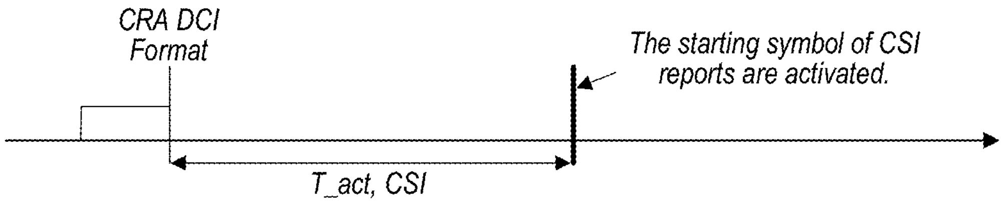
FIG. 15

Opt.2-1

Opt.2-2

CHANNEL STATE INFORMATION REPORTING FOR REDUCED CAPABILITY WIRELESS DEVICE OPERATION

PRIORITY INFORMATION

This application is a national phase entry of PCT Application No. PCT/CN2022/083013 entitled "Channel State Information Reporting for Reduced Capability Wireless Device Operation," filed Mar. 25, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing channel state information reporting for reduced capacity devices in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing channel state information reporting for deactivated frequencies in a wireless communication system.

In some embodiments, an apparatus, may comprise a processor. The processor may be configured to cause a wireless device to: establish communication with a cellular network; receive, from the cellular network, configuration information for reporting of channel state information (CSI) for a plurality of bandwidth parts (BWPs) including a one active BWP and one or more deactivated BWP; receive, from the cellular network, CSI reference signal (CSI-RS) resources using the active BWP and the one or more deactivated BWPs; perform measurements of the CSI-RS resources located in the active BWP and the one or more deactivated BWPs; and transmit, to the cellular network, one or more CSI report based on the measurements of the CSI-RS located in the active BWP and the one or more deactivated BWPs.

In some embodiments, a wireless device may comprise: a radio; and a processor operably coupled to the radio and configured to cause the wireless device to: establish communication with a cellular network, wherein the communication uses an active bandwidth part (BWP); determine to provide channel state information (CSI) associated with a deactivated BWP to the cellular network; receive, from the cellular network, CSI reference signals that are located in the deactivated BWP; perform at least one CSI measurement of the CSI reference signals; and transmit, to the cellular network, a channel state information report based on the at least one measurement.

In some embodiments, a method, may comprise, at a base station: establishing communication with a wireless device; providing, to the wireless device, configuration for measurement reporting for an active bandwidth part (BWP) and for a deactivated BWP; transmitting, to the wireless device, a reference signal on the deactivated BWP; and receiving, from the wireless device, a report based on measurement of the reference signal on the deactivated BWP according to the configuration for measurement reporting.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 6-18 illustrate exemplary aspects of various possible approaches to channel state information reporting for deactivated bandwidth parts by reduced capability devices operating wireless communication system, according to some embodiments.

Figure 1:
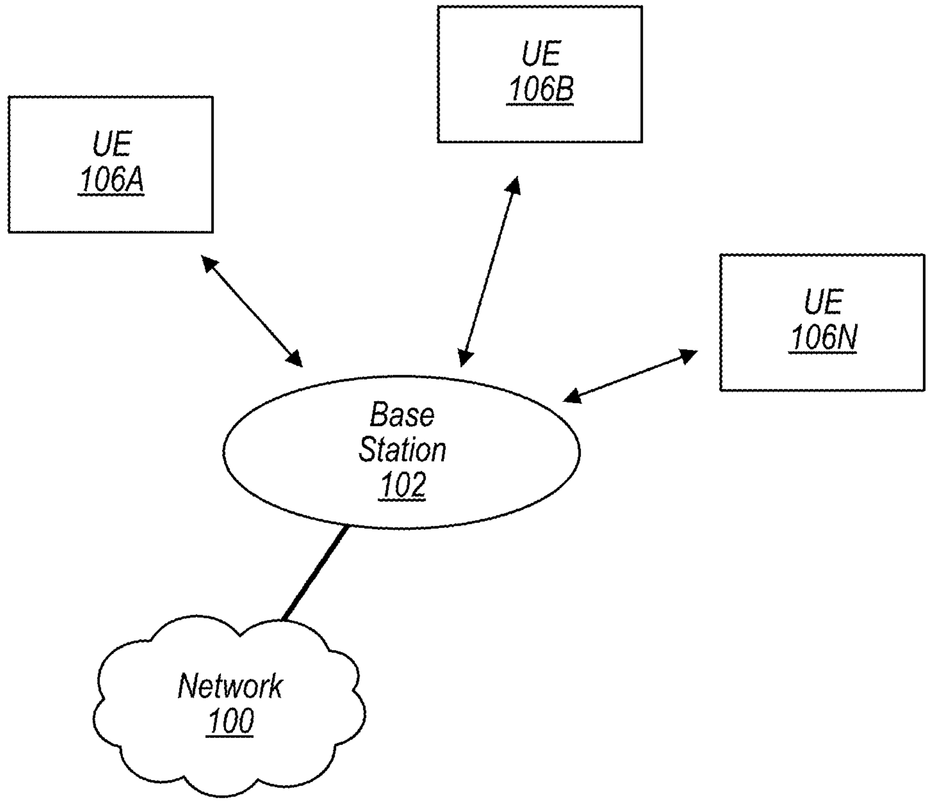
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™_based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
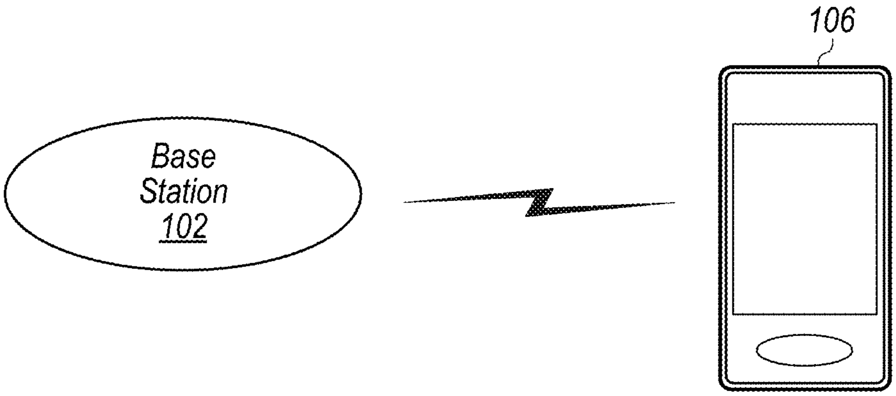
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard.

In some embodiments, the UE 106 may be a reduced capability (RedCap) device or enhanced Redcap (eRedcap) device. The UE 106 may be configured to perform techniques for performing channel state information reporting for one or more deactivated bandwidth part (BWP) in a wireless communication system, such as according to the various methods described herein.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS/TRP 102 may also include any number of antennas and may be configured to use the antennas to transmit and/or receive directional wireless signals (e.g., beams). To receive and/or transmit such directional signals, the antennas of the UE 106 and/or BS/TRP 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
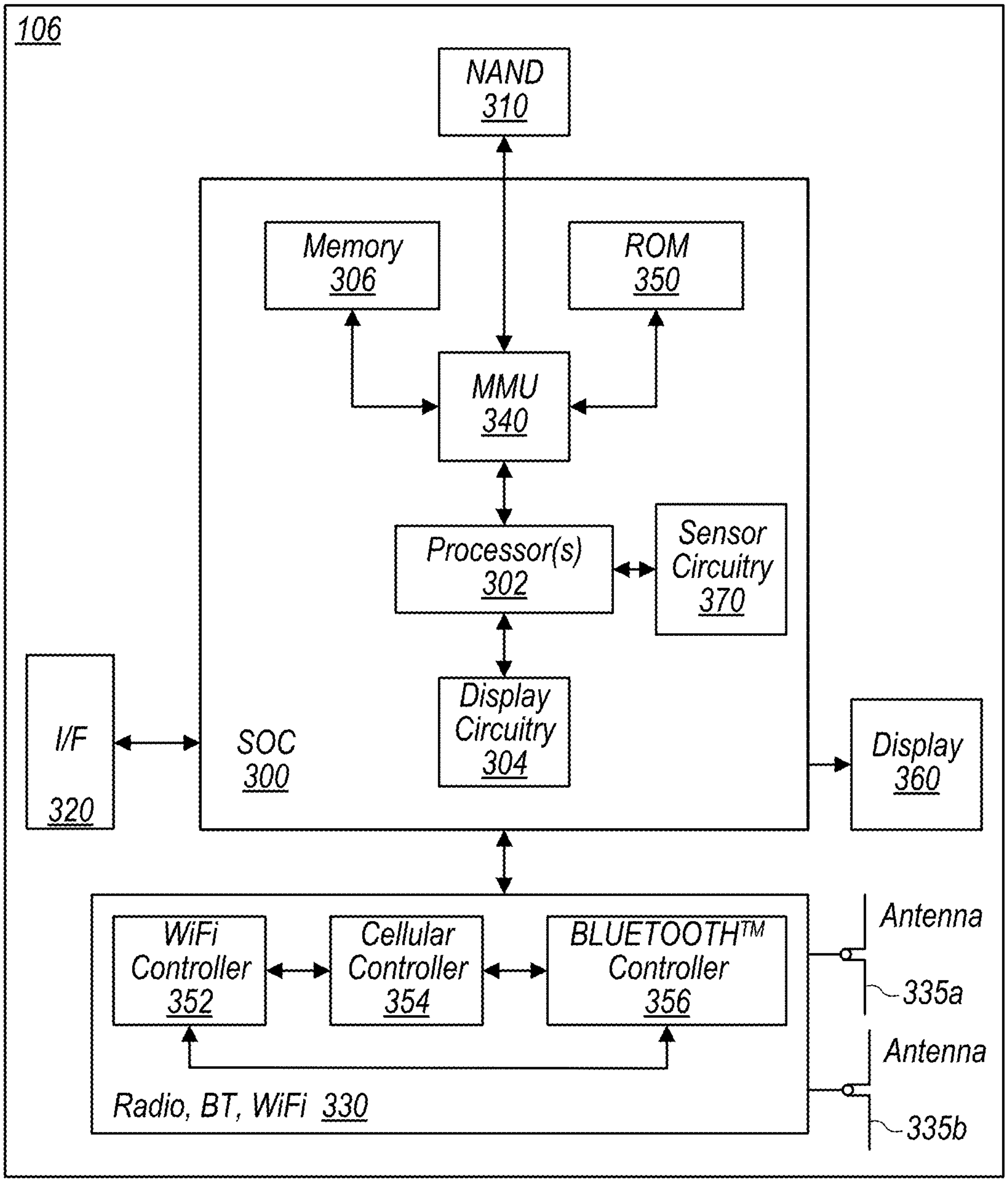
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335*a*), and possibly multiple antennas (e.g., illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for performing channel state information reporting for deactivated BWP(s) in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for performing channel state information reporting for deactivated BWP(s) in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
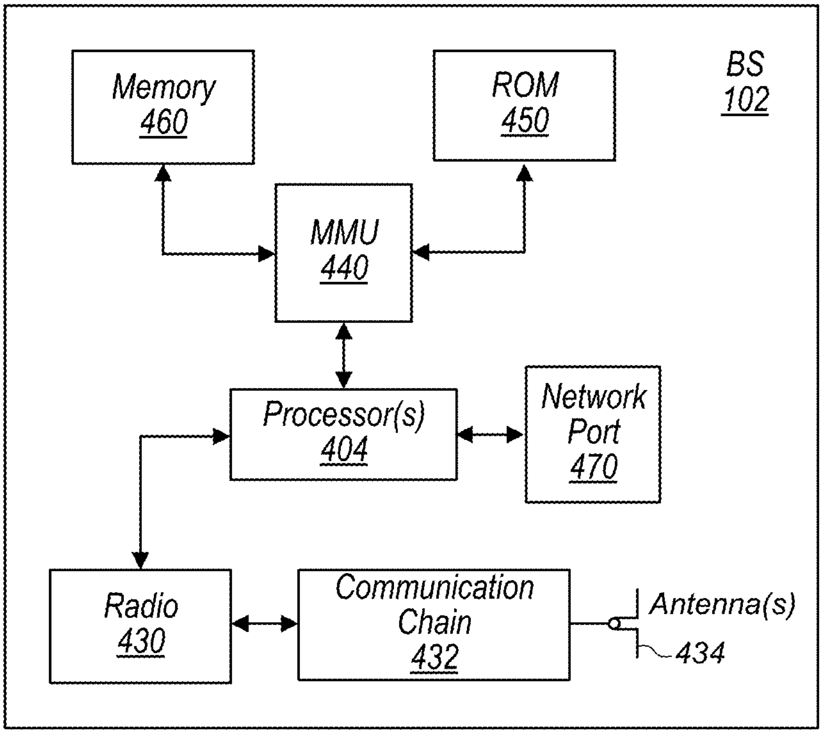
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS/TRP 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more cellular base stations (BSs) and/or transmission and reception points (TRPs). For example, initial access and beam measurement by a wireless device may be performed based at least in part on synchronization signal blocks (SSBs) provided by one or more cells provided by one or more BS/TRP within communicative range of the wireless device. Another type of reference signal commonly provided in a cellular communication system may include channel state information (CSI) RS (e.g., CSI-RS resource sets). A CSI-RS resource set may be a configurable group of time and frequency resources on which CSI-RS are transmitted. For example, a CSI-RS resource set may include frequency resources of one or more BWPs (e.g., with or without frequency gaps between parts of the frequency resources). For example, in the existing NR Rel-15/16/17 system, a CSI-RS resource set may be limited within a single DL BWP. However, wideband CSI-RS across multiple BWP may be used according to some embodiments. A CSI-RS resource set may include repetition in time according to a pattern or schedule.

Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS/TRP. The base station can then receive and use this channel state information to determine an adjustment of various parameters during communication with the wireless device. In particular, the BS/TRP may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a high channel coding rate. As another example, when the downlink channel communication quality between the base station and the UE is determined to be low, the UE may feed back a low CQI value, which may cause the base station to transmit data using a relatively low modulation order and/or a low channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, N represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS/TRP may include four receiver chains, e.g., may include four antennas. The BS/TRP may also include four or more antennas to enable MIMO communication (e.g., 4×4 MIMO). Thus, the UE may be capable of receiving up to four (or more) signals (e.g., layers) from the BS/TRP concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS/TRP may send to the UE in an upcoming time period (e.g., during an upcoming transmission time interval or TTI). For example, an indication of rank 4 may indicate that the BS/TRP will send 4 signals to the UE. As one possibility, the RI may be two bits in length (e.g., since two bits are sufficient to distinguish 4 different rank values). Note that other numbers and/or configurations of antennas (e.g., at either or both of the UE or the BS/TRP) and/or other numbers of data layers are also possible, according to various embodiments.

Figure 5:
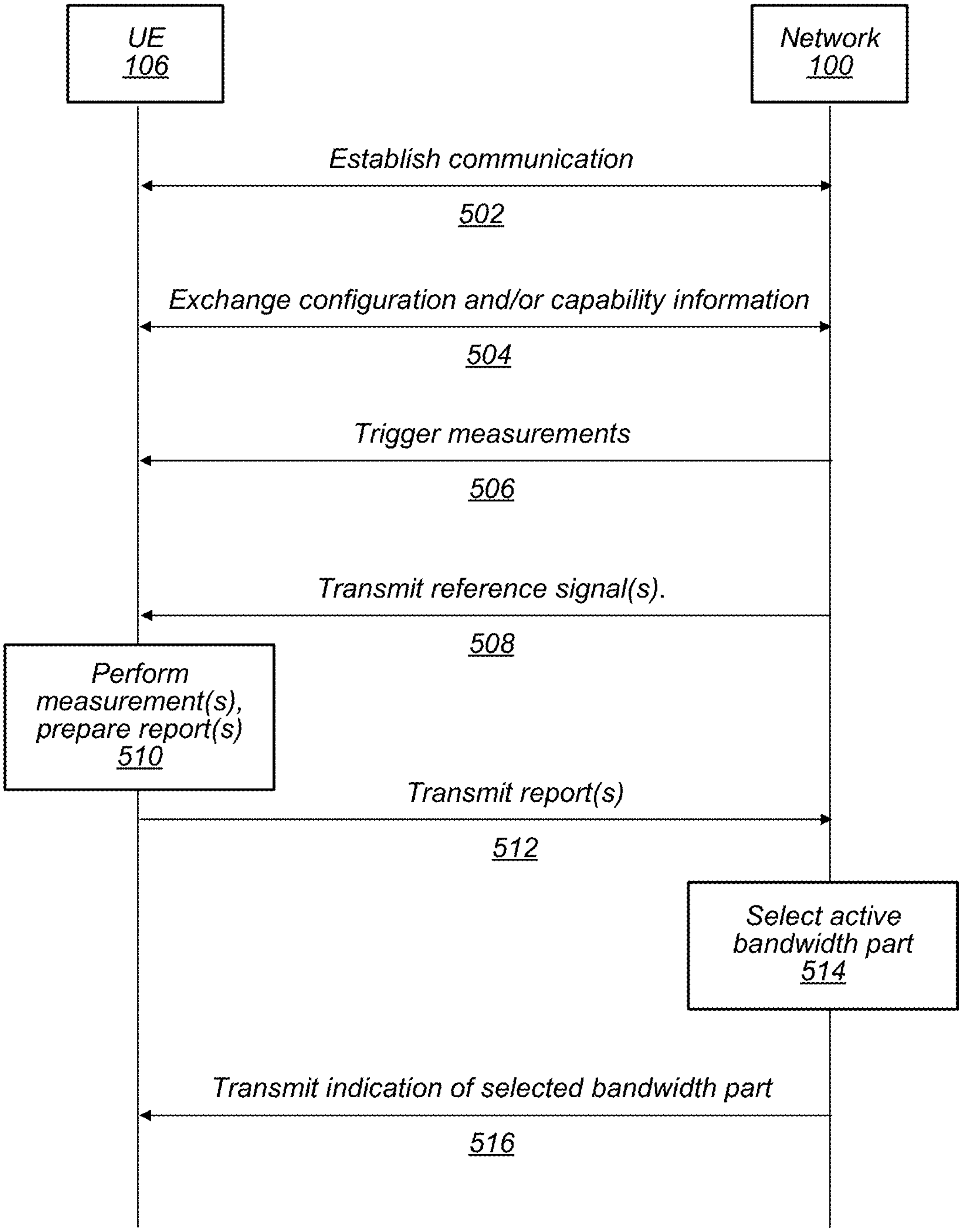
FIG. 5 is a flowchart diagram illustrating aspects of an exemplary possible method for performing channel state information reporting for deactivated bandwidth parts by reduced capability devices operating in a wireless communication system, according to some embodiments.

FIG. 5—Channel State Information Reporting for One or More Deactivated Bandwidth Part (BWP) Configured for Reduced Capability Devices According to some cellular communication technologies, it may be possible for a reduced capability (Redcap) wireless device (such as an enhanced Redcap (eRedcap) wireless device) to communicate with a cellular network (e.g., via one or more BS/TRP). In some embodiments, a difference between 'Redcap' in Rel-17 and 'eRedcap' in Rel-18 is the supported bandwidth. The maximum BW of Redcap may be 20 MHz and the maximum BW for eRedcap may be 5 MHz. An eRedcap device may be able to transmit and/or receive on only one active bandwidth part (BWP) at a time. A different active BWP may be used for transmission and/or reception at a different time. In other words, an eRedcap device may retune its (e.g., RF) radio or other hardware or software to operate on different set of frequencies (e.g., contiguous Resources Blocks (RBs) such as a single BWP) at different times, but only one set of frequencies (e.g., an active BWP in a single component carrier (CC)) may be used at any given time. Other sets of frequency contiguous RBs may be deactivated (e.g., deactivated BWP). A set of contiguous RBs in frequency domain is termed as 'a bandwidth part' (BWP) and a UE can be configured with up to four BWPs for a given CC, according to some embodiments.

For example, through the release (Rel)-17 NR RedCap work item, 3GPP may have established a framework for enabling reduced capability NR devices suitable for a range of use cases, including the industrial sensors, video surveillance, and wearables use cases, with requirements on low UE complexity and sometimes also on low UE power consumption.

In RAN plenary 94 e-meeting, a new Rel-18 study item "on further NR RedCap UE complexity/cost reduction" was approved at RP-213636, which target to further expand the market for eRedcap use cases with relatively low cost, low energy consumption, and low data rate requirements, e.g., industrial wireless sensor network use cases, some further complexity reduction enhancements should be considered. The supported peak data rate for Rel-18 eRedCap may target 10 Mbps. Rel-18 eRedCap may not overlap with existing LPWA solutions. Rel-18 may study further: UE complexity reduction techniques based on Rel-17 evaluation methodology in TR 38.875 [RAN1], UE bandwidth reduction to 5 MHz in frequency range (FR) 1, reduced UE peak data rate in FR1, and/or relaxed UE processing timeline for PDSCH and/or PUSCH and/or CSI.

In Rel-15, any individual CSI reporting may be associated with a single downlink (DL) BWP given in the associated CSI-ResourceConfig for channel measurement by RRC signaling.

Currently, NR may only support CSI measurement and reporting or channel sounding within an active BWP, e.g., for an eRedcap device. An eRedcap UE may be capable of operating on an active BWP of 11 physical resource blocks (PRBs) with 30 kHz subcarrier spacing (SCS). Such an 11 PRB BWP may occupy a small portion of entire component carrier (CC) bandwidth (BW), e.g., 11/270=4% CC BW. Thus, without CSI information on the other parts of CC BW, it is difficult for a network (e.g., BS/TRP) to efficiently switch an eRedcap UE to a suitable BWP to improve spectrum efficiency. In other words, CSI may be limited to an active BWP representing an extremely narrow portion of CC bandwidth, thus frustrating frequency selective scheduling for eRedcap UEs. Therefore, enhancement on the CSI measurement/acquisition/reporting outside the active BWP of Recap UE may support the deployment of eRedcap services to achieve a high spectral efficiency.

Thus, it may be beneficial to specify techniques for supporting effective channel state information reporting for additional bandwidth (e.g., deactivated BWP). To illustrate one such set of possible techniques, FIG. 5 is a communication flow diagram illustrating a method for performing channel state information reporting for deactivated BWP in a wireless communication system, at least according to some embodiments. For example, according to aspects of the method of FIG. 5, for a device such as eRedcap UE, a CSI reporting maybe associated with a set of downlink (DL) BWPs by RRC signaling for CSI measurement to mitigate the problem of DL narrowband measurement caused by the reduced bandwidth of eRedcap UE and therefore to enable a frequency selective scheduling for the device. The various DL BWPs associated with a single CSI reporting may be indicated by BWP ID and maybe active and/or deactivated. Further, a variety of approaches maybe used for the Periodic (P), Semi-Persistent (SP), and/or Aperiodic (AP) CSI measurement and reporting (e.g., P-CSI, SP-CSI, and/or AP-CSI report) for deactivated BWPs.

Aspects of the method of FIG. 5 may be implemented by a wireless device (such as an eRedcap device), e.g., in conjunction with a network, such as a UE 106 and a BS/TRP 102 illustrated in and described with respect to various of the Figures herein, or more generally in conjunction with any of the computer circuitry, systems, devices, elements, or components shown in the above Figures, among others, as desired. For example, a processor (e.g., 302, 352, 354, 356, 404, etc. and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device 106 may establish a communication (e.g., a wireless link) with a cellular network 100 (502), according to some embodiments. According to some embodiments, the wireless link may include a cellular link according to 5G NR. For example, the wireless device may establish a session with an AMF entity of the cellular network by way of one or more gNBs/BSs/TRPs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a radio resource control (RRC) connection with a serving cell, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

The wireless device and network may exchange configuration and/or capability information (504), according to some embodiments. Aspects of the configuration information may be responsive to aspects of the capability information and/or vice versa. Similarly, the wireless device may provide capability information in response to a query from the network, among various possibilities.

Such capability information may include information relating to any of a variety of types of wireless device capabilities. For example, the wireless device may provide information about its abilities relating to measuring and reporting of reference signals (e.g., CSI reporting, etc.) outside of an active BWP. For example, the wireless device may provide information about the time to retune from one frequency (e.g., BWP) to another. As another possibility, the wireless device may indicate a widest frequency range for which it can perform CSI measurements at a given time. Similarly, the wireless device may indicate a highest frequency granularity for which in can perform CSI measurements. In some embodiments, different frequency granularities for CSI measurement may be indicated for different frequency ranges.

The network may configure the wireless device with one active BWP and any number of deactivated BWPs. In some embodiments, the network may configure the wireless device with a frequency hopping pattern or schedule, e.g., to change between the frequencies RB sets/BWPs. In some embodiments, a frequency hopping pattern/schedule may be coordinated with a data (e.g., physical downlink shared channel (PDSCH)) repetition pattern, e.g., so that DL transmissions may be repeated on different BWPs. It will be appreciated that CSI-RS may or may not be transmitted with PDSCH. Thus such frequency hopping may also be associated with measuring CSI according to the pattern/schedule, according to some embodiments. However, CSI-RS and PDSCH may also be transmitted separately (e.g., at separate times according to TDM). Further, the network may provide configuration information related to subcarrier spacing (SCS), e.g., in a FR or CC associated with the BWPs.

The network may configure the wireless device with one or more measurement and reporting configurations, such as CSI reporting configuration(s). For example, one or more CSI-ResourceConfig information element (IE) may be provided to the UE by RRC or other higher layer signaling. A CSI reporting configuration may be identified by a CSI reporting ID i. Such a CSI configuration may provide CSI-RS (e.g., using one or more CSI-RS resource set) and reporting configuration for any number of BWPs, e.g., including the active BWP and/or one or more deactivated BWPs. The CSI-RS resource set may be configured over (e.g., common to) multiple BWPs or different CSI-RS resource sets may be configured for different BWPs (e.g., on a per-BWP basis and/or for groups of BWPs). A CSI reporting ID may be for P-CSI, SP-CSI, or AP-CSI. In some embodiments, the configuration information may indicate separate CSI reporting IDs to activate and deactivate a reporting configuration. As one possibility, the network may provide one or more tables of CSI reporting IDs to the wireless device via RRC or other signaling with each reporting ID associated with activation or deactivation of a different reporting configuration for one or more BWPs. The BWP ID of a BWP may be included in different CSI reporting with different CSI reporting IDs, e.g., for the same or different types of CSI using the same or different CSI-RS resource sets.

The network may configure the wireless device to provide reporting (e.g., CSI reporting, such as CQI) for the BWP(s) at one or more times and/or in one or more ways. For example, the network may provide configuration for P-CSI, SP-CSI, and/or AP-CSI.

Within a particular type of CSI reporting (e.g., Periodic CSI reporting), CSI information for different BWPs may be configured to be reported at the same time (e.g., on a per-BWP basis and/or on a combined, e.g., wideband (WB) basis) or at different times, e.g., with each CSI reporting for a separate BWP.

Similarly, within a particular type of CSI reporting (e.g., Periodic CSI reporting), any number of CSI-RS resource sets may be used. For example, different CSI-RS resource sets may be configured for different BWPs (e.g., on a per-BWP basis and/or for groups of BWPs) or a common CSI-RS resource set (e.g., covering the union of the configured BWPs) may be configured.

Further, various timing parameters may be determined by the network and transmitted to the wireless device as configuration information, according to some embodiments. For example, for P-CSI and/or SP-CSI parameters such as periodicity $T_{CSI}$ and offset $T_{Offset}$ may be provided to the wireless device. For example, $T_{CSI}$ may describe the periodicity of CSI reporting. Similarly, a parameter for the amount of time to switch between BWPs, $T_{Switching}$ may be provided. Note, $T_{Switching}$ may be used for determination of AP-CSI location in time domain, according to some embodiments. Note that, for each (e.g., aperiodic) CSI-RS resource set of a deactivated BWP i, a separate offset value $O_i$ maybe configured for the associated CSI resource set. The value(s) of $O_i$ may be configured for (e.g., aperiodic) CSI-RS resource set in association with a aperiodic CSI reporting ID. The Offset may indicate the amount of time between the last symbol of a message (e.g., PDCCH) activating/triggering a CSI reporting and the first symbol of a relevant CSI-RS resource set. Respective gaps between a last symbol of CSI resource set i and the first symbol of CSI resource set j should be greater than or equal to $T_{switching}$, where the CSI resource set i is located in BWP i and the CSI resource set i is located in BWP j, and the UE performs RF retuning from BWP i to BWP j for CSI measurement. In some embodiments, $T_{offset}$ may be a parameter for periodic CSI reporting and O may be a parameter for Aperiodic CSI reporting.

Any of these timing parameters may be measured in any desired time unit, such as slots, ms, etc. The network may determine these parameters based on capability information, e.g., retuning time capability, indicated by the wireless device.

In some embodiments, additional timing parameters may be determined by the network and provided to the wireless device. For example, report timing for P-CSI and/or SP-CSI may be determined according to either of the following equations, among various possibilities. In other words, an eRedcap device may transmit a CSI report for a BWP index i, for i>0 based on measurement of the CSI-RS transmitted in the BWP i in frames with system frame number (SFN) $n_f$ and slot number within the frame $$n^u_{s,f}$$

satisfying:

$$\left(N_{slot}^{frame,u} n_f + n^u_{s,f} - T_{offset} * i\right) \bmod (T_{CSI} * B) = 0 \quad \text{Equation 1}$$

$$\left(N_{slot}^{frame,u} n_f + n^u_{s,f} - T_{offset} * i\right) \bmod T_{CSI} = 0 \quad \text{Equation 2}$$

Where u may be the SCS configuration of the uplink (UL) BWP on which the CSI report is to be transmitted and B may be the number of DL BWPs for which CSI measurement is to be reported. It will be appreciated that some of these parameters may be used as discussed in TS 38.211. However, other parameters, e.g., $T_{CSI}$ and $T_{Offset}$ may be new and may be used as discussed herein. Further, it will be appreciated that the BWP i may be either activated or deactivated at the time instant that the measurement for CSI based on CSI-RS resource set on BWP i is performed. As noted above, measuring CSI based on one or more CSI-RS resource sets on deactivated BWPs may help provide channel information to the network. Such complete information may support efficient frequency selective scheduling.

In some embodiments, the configuration information may include a frequency granularity for CSI reporting. For example, the frequency granularity of the CSI Report may be on a BWP basis (e.g., a wideband CQI may be reported per BWP). As another example, the frequency granularity may be a number (e.g., one or more) of BWPs for which to report a wideband CQI (e.g., aggregated over the union of the BWPs). In some embodiments, the configuration information may include an indicator to aggregate CQI over all BWPs to be reported in the CSI report. It will be appreciated that using a frequency granularity of one or more BWPs may serve to reduce the power consumption at the device for CSI reporting, e.g., relative to higher granularity CSI reporting as may be performed (e.g., by non-redcap devices, in some instances).

In some embodiments, the configuration may include indication of which BWP(s) are (e.g., initially or by default) activated/deactivated for purposes of CSI reporting. For example, the default state of CSI reporting associated with deactivated BWPs may be deactivated (e.g., the wireless device is configured to only provide CSI for an active BWP). Alternatively, CSI reporting for deactivated BWP maybe configured to be activated and/or deactivated as part of CSI reporting configurations by a new IE (e.g., provided via RRC).

In some embodiments, the configuration information of a CSI reporting ID may include a number of times that reports are to be provided, e.g., according to SP-CSI. Such a number of reports may indicate a number of times that the wireless device is configured to provide a report for the combination of BWPs included in the reporting ID. For example, if the CSI reporting ID covers 3 BWPs and the number of times is 2, the wireless device may be configured to provide reports for the 3 BWPs twice.

In some embodiments, the configuration information may include indicated mappings between possible values of one or more of the various fields discussed herein and corresponding meanings. For example, the configuration information may include a table mapping respective values of a CSI Reporting Activation (CRA) field to respective meanings (e.g., lists of CSI reporting IDs).

In some embodiments, the configuration information may include an indication of the delay between activation of a CSI reporting ID and the first relevant CSI resource and/or the expected transmission of a responsive CSI report. Such a delay may be referred to as $T_{act,\ CSI}$ and may be measured in any convenient unit of time (e.g., slots, ms, etc.). In some embodiments, different delays may be associated with different CSI reporting IDs (e.g., the delay may be ID specific). Alternatively, the delays may be common, e.g., to different types of CSI (e.g., one delay for P-CSI, one for SP-CSI, one for AP-CSI). Different delay groupings may be used as desired.

In some embodiments, the network may determine to trigger (e.g., activate) measurements and may send a signal to the wireless device to trigger measurements (506), according to some embodiments. For example, the network may determine to trigger P-CSI, SP-CSI, and/or AP-CSI reporting, e.g., based on measurements performed at one or more BS/TRP (e.g., of reception of signals from the wireless device, levels of interference, etc.), measurements reported to the network (e.g., by the same and/or different wireless device), scheduling information, etc.

For example, new signaling maybe introduced to active/deactivate a RRC-configured CSI reporting that may be associated with a deactivated BWPs.

As one possibility, a new media access control (MAC) control element (MAC-CE) may be introduced for the (e.g., P or SP) CSI reporting activation/deactivation. For example, the MAC-CE may include a MAC subheader with a dedicated logical channel identifier (LCID) and a fixed size. The MAC-CE may consist of N octets containing two different IEs. For example, one may be $CSI_i$ and the other may be 'R' IE. The MAC-CE may include one or more $CSI_i$ field (or IE) indicating one or more CSI reporting IDs to be activated or deactivated. Examples of such a MAC-CE are shown in FIGS. 12 and 13. The 'R' field/IE may be reserved and set to '0'.

FIG. 12 illustrates bitmap-based signaling, according to some embodiments. The $CSI_i$ field indicates the activation/deactivation for the CSI reporting ID i, which shall be activated or deactivated. For example, if $CSI_7$ includes a 1, reporting for ID 7 may be activated (or remain activated); if $CSI_7$ includes a 0, reporting for ID 7 may be deactivated (or remain deactivated). The reverse indication scheme may be used if desired.

FIG. 13 illustrates identifier based signaling, according to some embodiments. The $CSI_0$ field may indicate the CSI reporting ID that is activated or deactivated by the MAC CE. The field size may be 6-bits to indicate one from up to 48 CSI reporting IDs. "R" may represent a reserved bit and may be set to 0. In some embodiments, the wireless device may assume that the CSI reporting ID is to be activated, e.g., for a configured number of reports according to SP-CSI. In some embodiments, an additional bit may be used to indicate whether the CSI reporting ID is to be activated or deactivated (e.g., thus reducing the number of reserved bits or reducing the length of the $CSI_0$ field).

In comparison to FIG. 12, only one CSI reporting ID can be activated by a single MAC-CE of FIG. 13; however, in contrast to FIG. 12, a CSI reporting ID that is larger than '7' may be indicated for CSI reporting activation/deactivation operation.

As another possibility, a CSI reporting ID (e.g., associated with deactivated BWP(s)) may be activated or deactivated (e.g., for P or SP-CSI) by a DCI format. Various options may be used to enable DCI-based CSI reporting activation/deactivation. For example, the $CSI_i$ field or IE discussed above (e.g., with respect to either FIG. 12 or FIG. 13) maybe added into a DCI format to activate/deactivate the associated CSI reporting.

As another example, a CSI Reporting Activation (CRA) field maybe added into a DCI format. FIG. 14 illustrates an example coding of such a CRA field, according to some embodiments. Note that a value of CRA field may be associated with one or more CSI reporting IDs for CSI reporting activation operation, according to some embodiments. As noted above in 504, the association between CSI report(s) and a corresponding codepoint of CRA field maybe configured by RRC signaling. In the illustrated example, when all the bits of CRA field in DCI are set to zero, no CSI reporting activation for deactivated BWP may be requested (e.g., no CSI reporting ID is listed). As shown, each of the other CRA field values may correspond to activating or deactivating one or more corresponding CSI reporting IDs that may be configured by RRC signaling.

When the CRA field on a DCI activates one or more CSI report(s) for deactivated BWP(s), the UE shall provide a valid CSI report after $T_{act,\ CSI}$ delay based on the CSI reporting ID or configuration that may be activated by the CRA field in the received DCI. Such a delay is illustrated in FIG. 15, according to some embodiments. It will be appreciated that although FIG. 15 is illustrated using a DCI (e.g., a UL grant, etc.), a similar delay may be associated with other means of activating/deactivating CSI reporting, e.g., including MAC-CE etc.

To trigger AP-CSI, the network may include a CRA field in a UL grant transmitted to the wireless device, among various possibilities. Such a request may indicate to the wireless device to transmit the requested report on a physical UL shared channel (PUSCH) that may be scheduled by the UL grant. An association between a codepoint of 'CSI request' field and AP-CSI report(s) for active and/or deactivated BWP(s) maybe provided by RRC signaling. FIG. 14 provides one example of the association configuration. In the illustrated example, a single codepoint of 'CSI request' field may be associated with multiple CSI reporting IDs for CSI reporting activation operation, e.g., codepoint '01' may be associated with CSI reporting ID-Y1, CSI reporting ID-Y2, . . . and may be used to activate all of the associated CSI reporting IDs together.

Note that, for each AP-CSI resource of a deactivated BWP i, a separate offset value $O_i$ maybe configured for the associated CSI resource set transmitted on the deactivated BWP i. The value(s) of $O_i$ may be included in the DCI or may be configured in 504 (e.g., in association with a CSI reporting ID). The Offset may indicate the amount of time between the last symbol of the PDCCH carrying the triggering DCI and the first symbol of the aperiodic CSI-RS resource. Respective gaps between a last symbol of CSI resource set i and the first symbol of CSI resource set j should be greater than or equal to $T_{switching}$ where $T_{switching}$ mainly accounts for the RF retuning time from one BWP i to another BWP j for CSI-RS measurement.

Figure 18:
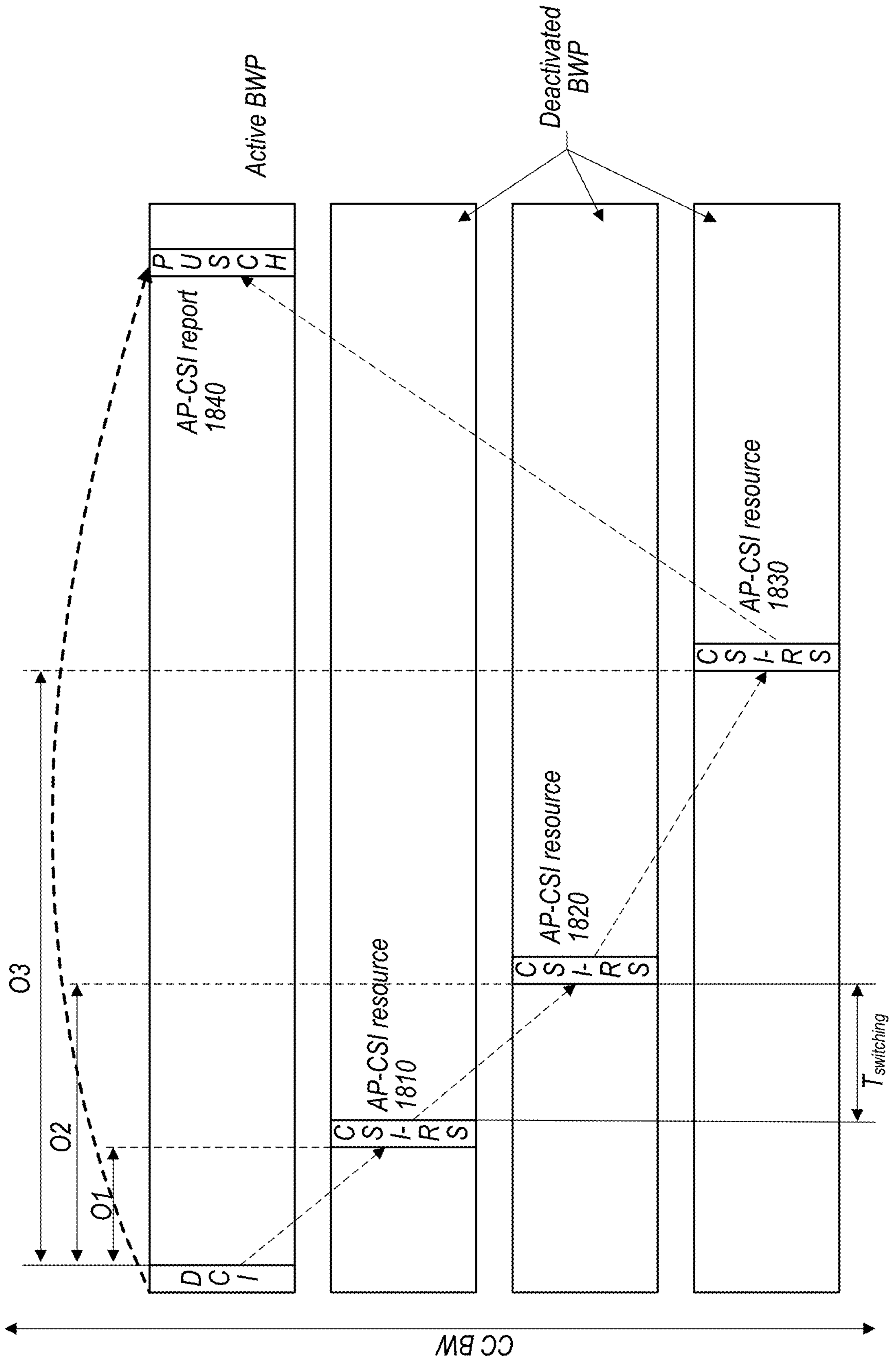

FIG. 18 provides one example of AP-CSI reporting, according to some embodiments. As shown, O1-O3 indicate respective delays between a triggering DCI (on an active BWP) and AP-CSI resources 1810, 1820, and 1830 for deactivated BWPs. As shown, the gap between 1810 and 1820 (e.g., O2 minus O1) is at least $T_{switching}$. Reports of the measurements of the deactivated BWPs are provided via PUSCH on the active BWP in 1840. It will be appreciated that although FIG. 18 is illustrated in terms of AP-CSI resources, the similar restriction for two consecutive resources for P-CSI or SP-CSI to ensure the gap between them may be at least $T_{switching}$.

In some embodiments, P-CSI measurements may be activated by RRC signaling. For example, and RRC reconfiguration may include activating and/or deactivating P-CSI measurements of one or more deactivated BWP.

The network (e.g., via one or more BS/TRP) may transmit reference signals (e.g., CSI-RS) to the wireless device (508), according to some embodiments. The network may transmit the reference signals according to the activated CSI reporting IDs and/or other configurations. For example, the network may transmit CSI-RS at the times and frequencies/BWPs associated with any active CSI reporting configurations. The timing may be based on the factors/parameters discussed above, e.g., including parameters related to timing offsets, activation timing, etc. The wireless device may receive the reference signals.

The RS may be transmitted with other information (e.g., PDSCH). Some or all of the RS (e.g., and other information) may be transmitted on deactivated BWPs. It will be appreciated that the wireless device (e.g., an eRedcap UE) may not be able to receive on more than one BWP at a time. Thus, the network may avoid transmitting data (e.g., PDSCH) or control information (e.g., PUCCH, other than the RS) to the active BWP while the wireless device is tuned to a deactivated BWP, changing to a deactivated BWP (or between deactivated BWP), and/or retuning to the active BWP. Similarly, the network may avoid scheduling uplink communication from the wireless device (e.g., on the active BWP) during these times.

The wireless device may perform measurement(s) of the reference signals and may prepare report(s) based on the measurement(s) (510), according to some embodiments. As discussed above, the wireless device may perform any variety of measurements using the received reference signals. For example, the wireless device may determine CQI of based on CSI-RS on a wideband basis (e.g., for multiple BWPs) and/or on a per-BWP basis. Other frequency granularities may be used as desired.

The wireless device may perform measurement(s) and generate report(s) for any combination of active CSI reporting IDs. For example, some BWPs may be measured according to more than one reporting ID while other BWPs may not be measured at all.

In some embodiments, different reports may be generated for different measurements. For example, CQI for different BWPs may be provided in different reports (e.g., at the same or different times).

In some embodiments, different measurements may be combined in a single report. For example, CQI for different BWPs (e.g., on a per BWP basis and/or on a wideband basis covering multiple BWPs) may be provided in single report.

The wireless device may determine timing for transmission of the report(s) to the network. For example, the timing may be determined according to the configuration of the activated CSI reporting IDs.

The wireless device may transmit the reports to the network (512), according to some embodiments. The report(s) may be transmitted according to the timing of the activated CSI reporting configurations. The report(s) may be transmitted on the active BWP. The report(s) may be transmitted on PUSCH and/or PUCCH. The network may receive the report(s).

The network may select an active BWP for the wireless device (514), according to some embodiments. The selected active BWP may be the same or different from a previous active BWP. The network may use the reported CSI/CQI information to inform scheduling decisions and select the active BWP for the wireless device. For example, the network may select a (e.g., previously deactivated) BWP with the best channel conditions as indicated in the reported CSI information.

The network may consider additional/alternative information for selecting the active BWP. For example, the network may consider channel measurements performed by one or more BS/TRP and/or reported by one or more other wireless devices.

The network may transmit an indication of the selected BWP to the wireless device (516), according to some embodiments. For example, the network may use RRC, MAC, or DCI signaling to indicate a change in active BWP. The network and the wireless device may use the new active BWP for further communication (e.g., after a delay of at least $T_{switching}$).

Thus, at least according to some embodiments, the method of FIG. 5 may be used to provide a framework according to which an eRedcap wireless device may be configured to perform channel state information measurements and reporting for one or more deactivated BWP (or more generally, for frequency outside of an active BWP), and thus to assist a cellular network to effectively and efficiently schedule and perform wireless communications with the wireless device, at least in some instances.

FIGS. 6-18 and Additional Information

FIGS. 6-18 illustrate further aspects that might be used in conjunction with the method of FIG. 5 if desired. It should be noted, however, that the exemplary details illustrated in and described with respect to FIGS. 6-18 are not intended to be limiting to the disclosure as a whole: numerous variations and alternatives to the details provided herein below are possible and should be considered within the scope of the disclosure.

It will be appreciated that active and deactivated BWPs may be specific to a particular wireless device. For example, a cellular network may simultaneously communicate with different devices using different BWPs as active for different devices.

FIG. 6 summarizes possible use cases for eRedcap wireless devices, according to some embodiments.

FIG. 7 illustrates maximum transmission bandwidth configurations for eRedcap devices according to different subcarrier bandwidths (e.g., the columns) and different subcarrier spacing (SCS) configurations (e.g., the rows), according to some embodiments. The 5 MHz bandwidth may be commonly used for eRedcap devices, but other configurations may be used as desired. For example, for a 5 MHz subcarrier and 30 kHz SCS, the maximum bandwidth of an active BWP may be 11 PRBs.

Figure 8:
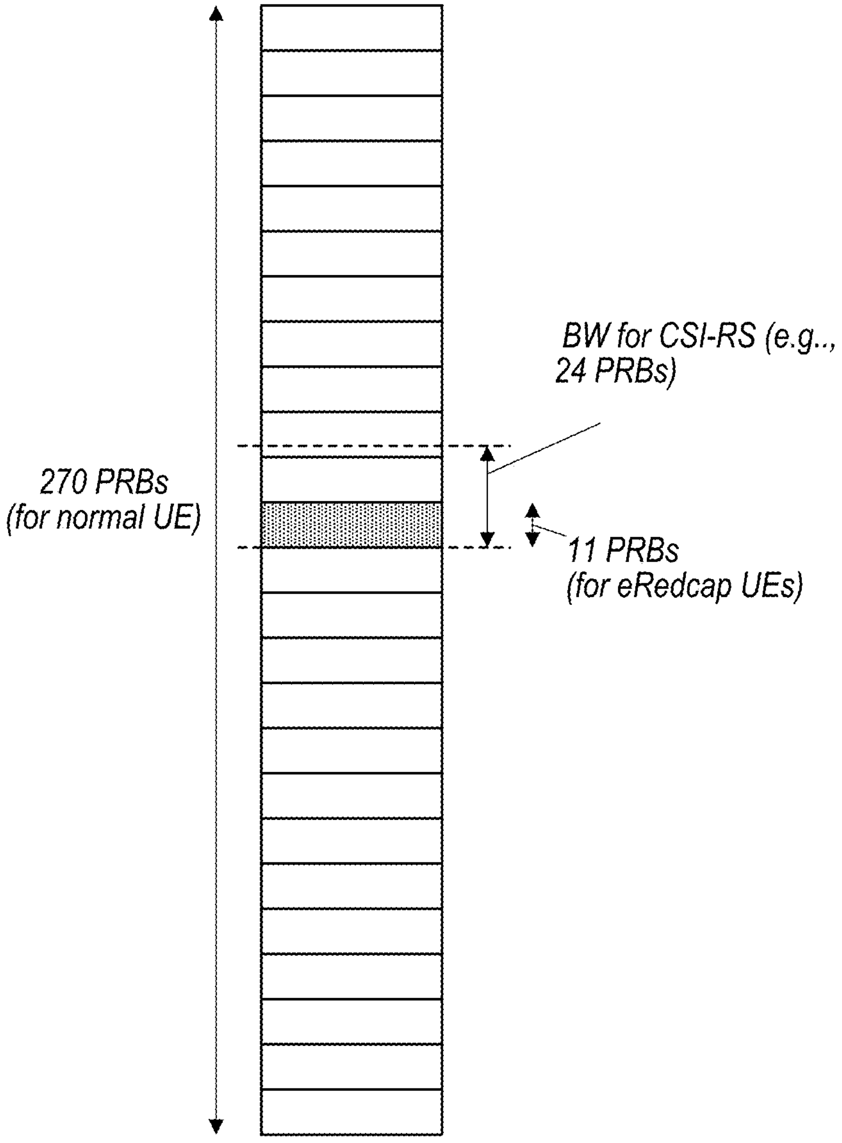

FIG. 8 illustrates an active BWP in relation to a component carrier (CC), according to some embodiments. A CC may consist of 270 PRBs (e.g., all of which may be used by some devices). A BW for CSI-RS transmitted within a CC may be 24 PRBs. An active BWP for an eRedcap UE may be 11 PRBs. Note that 11/270 PRBs is approximately 4% of the CC.

FIG. 9 illustrates a common CSI-RS resource shared for multiple BWPs for CSI reporting, according to some embodiments. For example, a CSI reporting ID may be associated with measurements and reporting as in FIG. 9. An eRedcap UE maybe configured with a number (e.g., up to four, in some examples) of DL BWPs with a single downlink bandwidth part being active at a given time. In addition, the eRedcap UE maybe configured with a periodic, semi-persistent (SP), and/or aperiodic (AP) CSI-RS resource set that covers the union of these RRC-configured UE-specific BWPs for an enhanced CSI reporting. It will be appreciated that the CSI-RS may be transmitted multiple times, e.g., so that the wireless device may perform measurements using one BWP (e.g., active or deactivated) at one CSI-RS transmission, with time in between allowing for retuning. The CSI reporting ID may be associated with the CSI-ResourcConfig as shown. The CSI-ResourceConfig may include a bwp-IdList, which may list the BWPs covered by the CSI-RS (e.g., for which the wireless device is configured to perform measurements and provide reports).

As discussed above, the wireless device may provide BWP-specific CSI reporting (e.g., with CQI indicated per BWP index), in some examples.

Additionally, or alternatively, the wireless device may use BWP-aggregation for CSI reporting (e.g., with a single WB-CQI reported for the union of aggregated BWPs), according to some embodiments. For example, this design may be used for an eRedcap UE which is configured with PDSCH repetition and frequency hopping across multiple RRC-configured BWPs. For this type of eRedcap UE, a wideband CQI may provide appropriate detail for PDSCH with frequency hopping with minimized UL control overhead.

Figure 10:
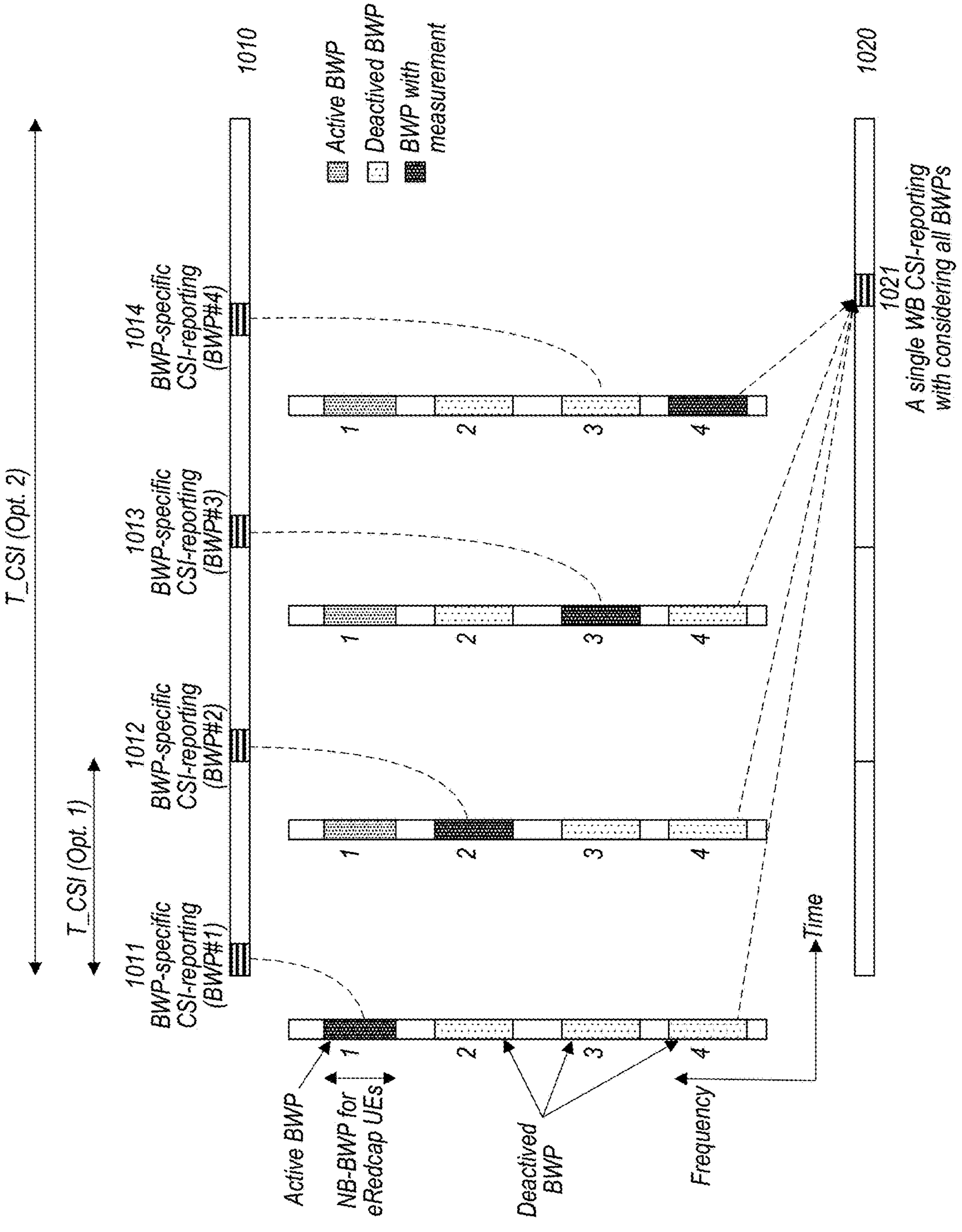

FIG. 10 provides an example of BWP-dedicated CSI reporting (1010) and BWP-aggregation CSI reporting (1020), according to some embodiments. As shown, 4 BWPs may be configured for an eRedcap UE with each consisting of 11 PRBs with 30 kHz SCS and numbering as BWP #1/2/3/4. The BWPs may be narrowband (NB) BWPs. BWP #1 may be activated and other BWPs may be deactivated. The eRedcap UE may be configured with a WB CSI-RS that covers all 4 BWPs. The WB CSI-RSI may be shared with other UEs (e.g., including non-Redcap UEs with larger BW capability) to minimize the CSI-RS overhead.

An eRedcap UE operating according to BWP-dedicated CSI reporting (e.g., as illustrated at 1010) may perform CSI measurement and reporting for BWP #1 on reporting occasion 1011. The eRedcap UE may also perform the CQI measurement on the corresponding CSI-RS segment within the deactivated BWP #2/#3/#4 and reports the measured CQI in occasion 1012/1013/1014, respectively.

An eRedcap UE operating according to BWP-aggregation CSI reporting (e.g., as illustrated at 1020) may perform measurement independently for each BWP #1/2/3/4 similar to 1010. However, the UE may report a single WB-CQI for the union of BWP #1/2/3/4 in occasion 1021.

According to both BWP-dedicated CSI reporting (1010) and BWP-aggregation CSI reporting (1020) separate CSI-RS resource set maybe transmitted on the different BWPs and a UE may preform RF retuning across these BWPs to measure the respective CSI-RS resource set for CSI reporting.

Figure 11:
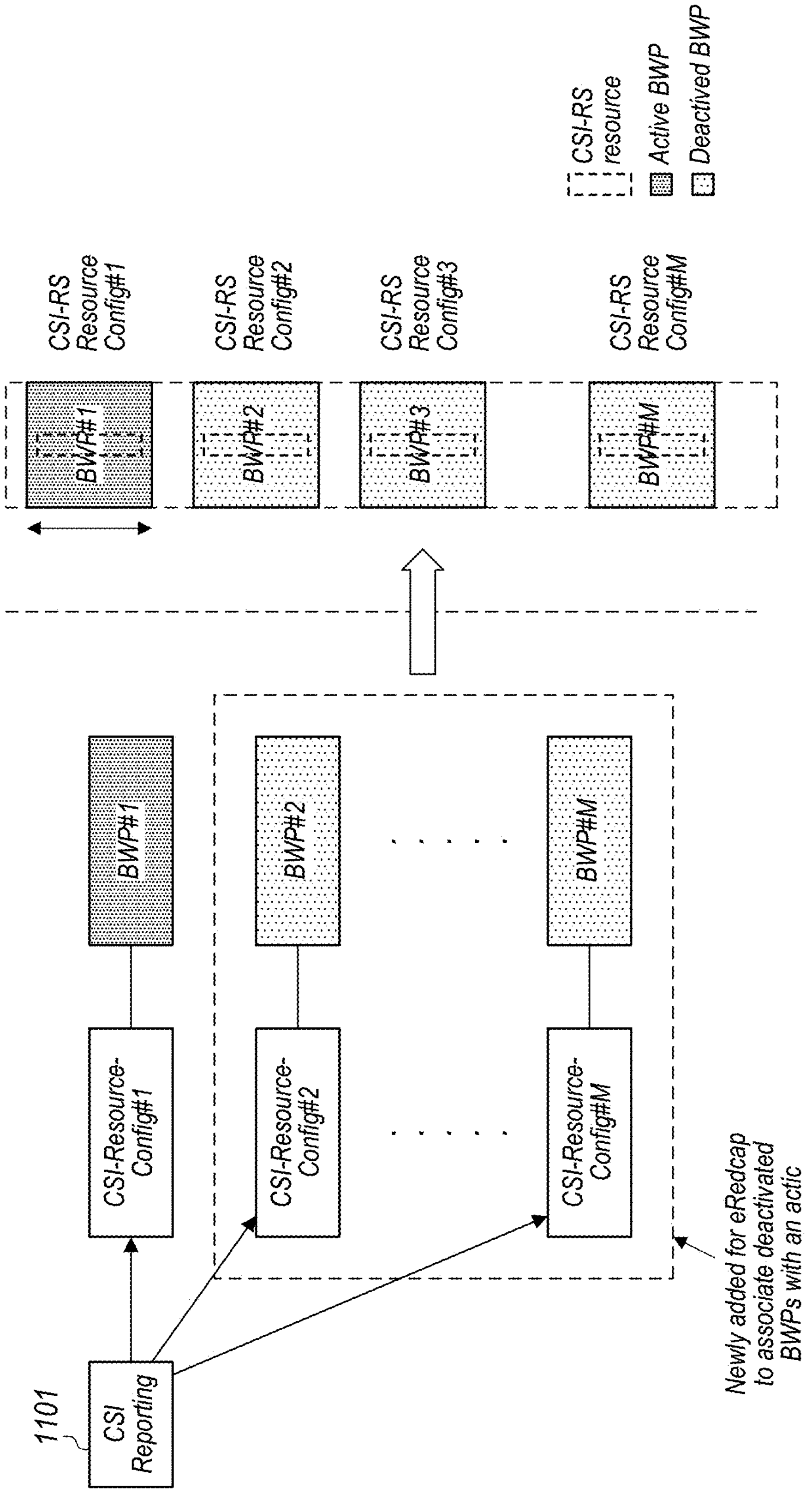

FIG. 11 illustrates an example of CSI using separate measurements for deactivated BWPs using separate CSI-RS configurations. A single CSI reporting occasion (e.g., and/or single CSI reporting ID) maybe associated with multiple CSI-RS resource configurations. In particular, each CSI-RS resource configuration (e.g., CSI-RS set) may be associated with a single active or deactivated DL BWP. The BWPs may be indicated by a higher layer parameter BWP-Id for channel measurement. In some embodiments, a P/SP-CSI reporting for deactivated BWPs may be enabled on condition that it consists of at least one P/SP-CSI reporting for an active BWP, (e.g., BWP #1) based on the CSI reporting that is configured by RRC signaling.

FIG. 11 provides one example in which one CSI reporting ID 1101 may be associated with both active BWP #1 and deactivated BWP #2/#3/ . . . /#M. As shown, the different BWPs may have different CSI resource configurations (e.g., BWP-specific configurations, with potentially different CSI-RS resource sets). In this example, the legacy CSI-Resource configuration IE may be reused to configure different CSI-RS resource sets for each BWP, according to some embodiments.

The approaches for determination of CSI reporting time illustrated in FIG. 10 may be used for the separate CSI-RS configuration approach, e.g., illustrated in FIG. 11, according to some embodiments. For example, as shown in 1020 of FIG. 10, the measurements may be performed at separate times, but reported at the same time 1021 on a single PUCCH/PUSCH. However, in contrast to 1020, the measurements may be provided in separate reports, e.g., according to the separate configurations for the separate BWPs. Alternatively, as in 1010 of FIG. 10, the measurements may be reported at different times.

In some embodiments, the following procedure may be used to support P/SP-CSI reporting for deactivated BWPs. It is noted that this detailed example is not limiting and that other examples may be used as desired.

Step-1: A eRedcap UE may be provided by higher layers with one or more P/SP-CSI reporting configurations that is associated with deactivated BWPs. Activation of CSI reporting may be determined according to various options including:

Option 1: The default state of CSI reporting associated with deactivated BWPs may be deactivated.

Option 2: The CSI reporting for deactivated BWP may be configured to be activated or deactivated as part of CSI reporting configurations by a new IE.

Step-2: A new signaling maybe introduced to active/deactivate a RRC-configured CSI reporting that is associated with a deactivated BWPs.

Option 1: A new MAC-CE may introduced for the CSI reporting activation/deactivation, which is identified by a MAC subheader with a dedicated LCID and has a fixed size. The MAC-CE consists of one or more octets containing two different IEs. The MAC-CE may include a $CSI_i$ field.

Option 1-1: Bitmap-based signaling. The $CSI_i$ field may indicate the activation/deactivation for the CSI reporting ID 'i', which may be activated or deactivated, as shown in FIG. 12.

Option 1-2: The $CSI_i$ field may indicate the CSI reporting ID that is activated by the MAC CE and field size is 6-bits to indicate one from up to 48 periodic CSI-RS reporting list. Comparing to Option 1-1, only one CSI reporting may be activated by a single MAC-CE. The $CSI_i$ field may include reserved bit (R), set to 0.

The P-CSI reporting associated with deactivated BWP may be activated by a DCI format. Various options may be considered to enable DCI-based CSI reporting activation/deactivation.

Option 1: The $CSI_i$ IE may be added into a DCI format to activate/deactivate the associated P-CSI reporting.

Option 2: An CSI Reporting Activation (CRA) field (e.g., as shown in FIG. 14) maybe added into a DCI Format. When all the bits of CRA field in DCI are set to zero, no CSI Reporting activation for deactivated BWP may be requested. The association between P-CSI report(s) and a corresponding codepoint of CRA field maybe configured by RRC signaling.

FIG. 14 provides an example of RRC-configured association between CRA code-points and the pairs. When the CRA field on a DCI activates P-CSI report(s) for deactivated BWP(s), the UE may provide a valid CSI report after $T_{act,\ CSI}$ delays based on the P-CSI reporting configuration, as illustrated in FIG. 15.

Option 2-1: The DCI Format may be a DCI used for scheduling PDSCH or PUSCH. Considering up to 4 BWPs may be configured for a CC and one P-CSI report per BWP may be sufficient for frequency selective scheduling, 2-bits CRA field may be newly added for a scheduling DCI.

Option 2-2: A group-specific DCI Format may be introduced for a group of activation/deactivation of P-CSI reports for one or multiple CCs and one or multiple UEs. The following information may be transmitted by means of the new DCI format X with CRC scrambled by CRA-RNTI: CRA block #1, CRA block #2, . . . , CRA block #B, where the starting position of a CRA block may be determined by the parameter startingBitOfFormatX provided by higher layers for the UE configured with the block. Each CRA block may be used to activate/deactivate P-CSI reports for a serving cell. The association between CRA code-points and P-CSI reports of a given CC may be configured by RRC signaling. In some designs, a table similar to FIG. 14 may be used for the association.

Figure 16:
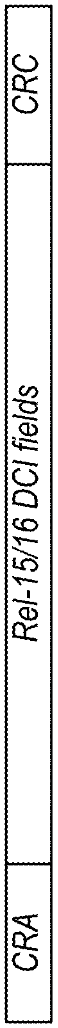
Figure 17:
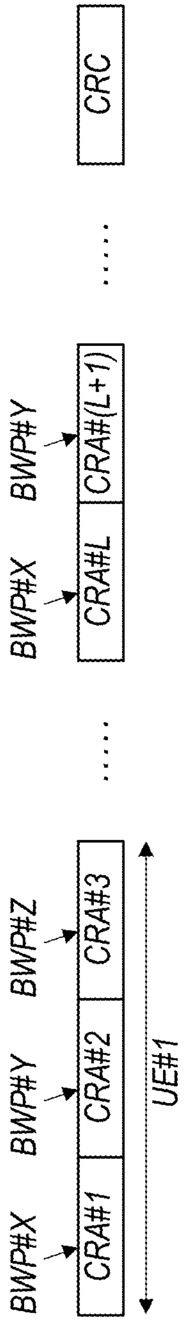

FIGS. 16 and 17 provide exemplified DCI formats based on option 2-1 and option 2-2 above, respectively, according to some embodiments.

In some embodiments, the following procedure may be used with respect to AP-CSI report for deactivated BWPs. Other examples may be used as desired.

Step-1: A eRedcap UE maybe provided by higher layers with one or more Aperiodic CSI (AP-CSI) report configurations that may be associated with deactivated BWPs.

Step-2: The 'CSI request' field in the UL grant may be used to trigger AP-CSI reports on a PUSCH, where the association between codepoint of 'CSI request' field and AP-CSI report(s) for active and/or deactivated BWP(s) may be provided by RRC signaling. FIG. 14 provides one example of the association configuration. Note that, for each AP-CSI reports of a deactivated $BWP_i$, a separate offset value ($O_i$) may be configured for the associated CSI resource set. The Offset may indicate time between the last symbol of the PDCCH carrying the triggering DCI and the first symbol of the aperiodic CSI-RS resource. The gap between the last symbol of CSI resource set i and the first symbol of CSI resource set j may be $T_{Switching}$ where $T_{Switching}$ may account for the RF retuning time from one BWP to another BWP for CSI-RS measurement. FIG. 18 provides one example of AP-CSI report 1840 for active BWP for deactivated BWPs based on the respective CSI-RS (1810-1830) on each BWP.

In the following further exemplary embodiments are provided.

One set of embodiments may include an apparatus, comprising: a processor configured to cause a wireless device to: establish communication with a cellular network; receive, from the cellular network, configuration information for reporting of channel state information (CSI) for a plurality of bandwidth parts (BWPs) including a one active BWP and one or more deactivated BWP; receive, from the cellular network, CSI reference signal (CSI-RS) resources using the active BWP and the one or more deactivated BWPs; perform measurements of the CSI-RS resources located in the active BWP and the one or more deactivated BWPs; and transmit, to the cellular network, one or more CSI report based on the measurements of the CSI-RS located in the active BWP and the one or more deactivated BWPs.

In some embodiments, the wireless device is a reduced capability user equipment device that is capable of transmission and/or reception on only the one active BWP at a time, wherein a different active BWP may be used for transmission and/or reception at a different time.

In some embodiments, to receive the CSI-RS using the one or more deactivated BWPs comprises: retuning a radio of the wireless device from the active BWP to the one or more deactivated BWPs, wherein the radio is retuned to a respective BWP of the one or more deactivated BWP at a respective time.

In some embodiments, the CSI-RS resources comprise a common resource spanning the active BWP and the one or more deactivated BWPs.

In some embodiments, the one or more CSI report comprises a CSI report for the active BWP and respective CSI reports for respective deactivated BWPs of the one or more deactivated BWPs.

In some embodiments, the one or more CSI report comprises a single wideband CSI report for the plurality of BWPs.

In some embodiments, the configuration information for reporting of CSI comprises a plurality of CSI-RS resource set configurations such that respective CSI-RS resource set configurations of the plurality of CSI-RS resource set configurations are located in respective BWPs of the plurality of BWPs.

According to a second set of embodiments, a wireless device may comprise: a radio; and a processor operably coupled to the radio and configured to cause the wireless device to: establish communication with a cellular network, wherein the communication uses an active bandwidth part (BWP); determine to provide channel state information (CSI) associated with a deactivated BWP to the cellular network; receive, from the cellular network, CSI reference signals that are located in the deactivated BWP; perform at least one CSI measurement of the CSI reference signals; and transmit, to the cellular network, a channel state information report based on the at least one measurement.

In some embodiments, the processor is further configured to cause the wireless device to: receive, from the cellular network, an indication to activate CSI reporting for the deactivated BWP, wherein the determination to provide the CSI associated with the deactivated BWP is based on the indication.

In some embodiments, the processor is further configured to cause the wireless device to: receive, from the cellular network via a higher layer, a periodic, semi-persistent, and/or aperiodic CSI reporting configuration for the deactivated BWP.

In some embodiments, the processor is further configured to cause the wireless device to: receive, from the cellular network, an uplink grant, wherein the determination to provide the CSI associated with the deactivated BWP is based on a request in the uplink grant.

In some embodiments, the processor is further configured to cause the wireless device to: determine a time of the reference signals based on an offset relative to the uplink grant, wherein the offset is specific to the deactivated BWP.

In a third set of embodiments, a method, may comprise, at a base station: establishing communication with a wireless device; providing, to the wireless device, configuration for measurement reporting for an active bandwidth part (BWP) and for a deactivated BWP; transmitting, to the wireless device, a reference signal on the deactivated BWP; and receiving, from the wireless device, a report based on measurement of the reference signal on the deactivated BWP according to the configuration for measurement reporting.

In some embodiments, the configuration for measurement reporting comprises a channel state information (CSI) reference signal (RS) (CSI-RS) resource set for the active BWP and a separate CSI-RS resource set for the deactivated BWP.

In some embodiments, the method further comprises: transmitting, to the wireless device, a request for an aperiodic measurement report of the deactivated BWP, wherein the report is responsive to the request.

In some embodiments, the configuration for measurement reporting comprises configuration of a channel state information (CSI) reference signal (RS) (CSI-RS) resource set covering a union of the active BWP and the deactivated BWP, wherein the reference signal is transmitted on the union of the active BWP and the deactivated BWP.

In some embodiments, the configuration for measurement reporting further configures measurement reporting for a plurality of deactivated BWPs, wherein the reference signal is transmitted a plurality of times on the plurality of deactivated BWPs, wherein the method further comprises: receiving, from the wireless device, respective reports based on respective measurement of the reference signal on respective deactivated BWPs.

In some embodiments, the method further comprises: activating reporting for the deactivated BWP by transmitting, to the wireless device, one of: a media access control (MAC) control element (MAC-CE); or a downlink control information (DCI).

In some embodiments, the MAC-CE comprises a set of 1-bit CSI triggering fields, wherein respective 1-bit CSI triggering fields indicate the activation or deactivation of respective configurations for measurement reporting.

In some embodiments, the method further comprising: providing, to the wireless device via radio resource control signaling, an indication of association between the configuration for measurement reporting and a corresponding value of a triggering field in the DCI.

In some embodiments, the active BWP and the deactivated BWP are specific to the wireless device.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:

a processor configured to, when executing instructions stored in a memory, perform operations comprising:
- communicate with a cellular network;
- receive, from the cellular network, configuration information for reporting of channel state information (CSI) for a plurality of bandwidth parts (BWPs) including a one active BWP and one or more deactivated BWP;
- receive, from the cellular network, CSI reference signal (CSI-RS) resources using the active BWP and the one or more deactivated BWPs;
- perform measurements of the CSI-RS resources located in the active BWP and the one or more deactivated BWPs; and
- encode, for transmission to the cellular network, one or more CSI report based on the measurements of the CSI-RS located in the active BWP and the one or more deactivated BWPs.

2. The apparatus of claim 1, wherein the processor is associated with a reduced capability user equipment device that is capable of transmission and/or reception on only the one active BWP at a time, wherein a different active BWP may be used for transmission and/or reception at a different time.

3. The apparatus of claim 1, wherein to receive the CSI-RS using the one or more deactivated BWPs comprises:

retuning a radio from the active BWP to the one or more deactivated BWPs, wherein the radio is retuned to a respective BWP of the one or more deactivated BWP at a respective time.

4. The apparatus of claim 1, wherein the CSI-RS resources comprise a common resource spanning the active BWP and the one or more deactivated BWPs.

5. The apparatus of claim 1, wherein the one or more CSI report comprises a CSI report for the active BWP and respective CSI reports for respective deactivated BWPs of the one or more deactivated BWPs.

6. The apparatus of claim 1, wherein the one or more CSI report comprises a single wideband CSI report for the plurality of BWPs.

7. The apparatus of claim 1, wherein the configuration information for reporting of CSI comprises a plurality of CSI-RS resource set configurations such that respective CSI-RS resource set configurations of the plurality of CSI-RS resource set configurations are located in respective BWPs of the plurality of BWPs.

8. An apparatus, comprising:

a processor configured to, when executing instructions stored in a memory, perform operations comprising:
- communicate with a cellular network, wherein the communication uses an active bandwidth part (BWP);
- determine to provide channel state information (CSI) associated with a deactivated BWP to the cellular network;

receive, from the cellular network, CSI reference signals that are located in the deactivated BWP;

perform at least one CSI measurement of the CSI reference signals; and encode, for transmission to the cellular network, a channel state information report based on the at least one measurement.

9. The apparatus of claim 8, the operations further comprising:

receive, from the cellular network, an indication to activate CSI reporting for the deactivated BWP, wherein the determination to provide the CSI associated with the deactivated BWP is based on the indication.

10. The apparatus of claim 8, the operations further comprising:

receive, from the cellular network via a higher layer, a periodic, semi-persistent, and/or aperiodic CSI reporting configuration for the deactivated BWP.

11. The apparatus of claim 8, the operations further comprising:

receive, from the cellular network, an uplink grant, wherein the determination to provide the CSI associated with the deactivated BWP is based on a request in the uplink grant.

12. The apparatus of claim 11, the operations further comprising:

determine a time of the reference signals based on an offset relative to the uplink grant, wherein the offset is specific to the deactivated BWP.

13. A method, comprising:

communicating with a wireless device;

providing, to the wireless device, configuration for measurement reporting for an active bandwidth part (BWP) and for a deactivated BWP;

transmitting, to the wireless device, a reference signal on the deactivated BWP; and receiving, from the wireless device, a report based on measurement of the reference signal on the deactivated BWP according to the configuration for measurement reporting.

14. The method of claim 13, wherein the configuration for measurement reporting comprises a channel state information (CSI) reference signal (RS) (CSI-RS) resource set for the active BWP and a separate CSI-RS resource set for the deactivated BWP.

15. The method of claim 13, wherein the method further comprises:

transmitting, to the wireless device, a request for an aperiodic measurement report of the deactivated BWP, wherein the report is responsive to the request.

16. The method of claim 13, wherein the configuration for measurement reporting comprises configuration of a channel state information (CSI) reference signal (RS) (CSI-RS) resource set covering a union of the active BWP and the deactivated BWP, wherein the reference signal is transmitted on the union of the active BWP and the deactivated BWP.

17. The method of claim 13, wherein the configuration for measurement reporting further configures measurement reporting for a plurality of deactivated BWPs, wherein the reference signal is transmitted a plurality of times on the plurality of deactivated BWPs, wherein the method further comprises:

receiving, from the wireless device, respective reports based on respective measurement of the reference signal on respective deactivated BWPs.

18. The method of claim 13, wherein the method further comprises:

activating reporting for the deactivated BWP by transmitting, to the wireless device, one of:

a media access control (MAC) control element (MAC-CE); or a downlink control information (DCI).

19. The method of claim 18, wherein the MAC-CE comprises a set of 1-bit CSI triggering fields, wherein respective 1-bit CSI triggering fields indicate the activation or deactivation of respective configurations for measurement reporting.

20. The method of claim 18, further comprising:

providing, to the wireless device via radio resource control signaling, an indication of association between the configuration for measurement reporting and a corresponding value of a triggering field in the DCI.

* * * * *